Dec. 1, 1959 L. A. HOLDER 2,915,154
COMBINATION SEAT AND CARRYING BAG
Filed March 26, 1958

INVENTOR.
LORRAIN A. HOLDER
BY
Alfred C. Bully
ATTORNEY

United States Patent Office 2,915,154
Patented Dec. 1, 1959

2,915,154

COMBINATION SEAT AND CARRYING BAG

Lorrain A. Holder, Cleveland, Ohio

Application March 26, 1958, Serial No. 724,159

6 Claims. (Cl. 190—8)

This invention pertains to a combination seat and carrying bag and more particularly to a folding device which when folded into one position may serve as a bag for carrying various small articles and which when partially unfolded, serves as a seat with a back rest or when entirely unfolded, can serve as a flat ground cover.

The principal object of the invention is the provision of a new and improved combination folding seat and carrying bag which is light in weight, easy to fold and carry and adjustable into an infinite variety of seat positions.

Another object of the invention is the provision of a new and improved combination folding seat and carrying bag wherein substantially all of the parts thereof serve a utilitarian purpose for either function.

Still another object of the invention is the provision of a new and improved seat which readily folds into a carrying bag and which has a maximum capacity for articles to be carried.

Another object of the invention is the provision of a new and improved foldable seat having a pillow incorporated therein, which pillow also performs as a closure cover.

For a better understanding of the present invention, together with other and further objects thereof, references to the following description taken in connection with the accompanying drawings and its scope will be pointed out in the appended claims.

The invention is primarily intended as a back rest and/or a ground cover for use at the beach or as a lawn chair and is so constructed and arranged that it may be folded up into a bag suitable for carrying numerous small articles to and from the point of use as a back rest or ground cover.

Figure 1:
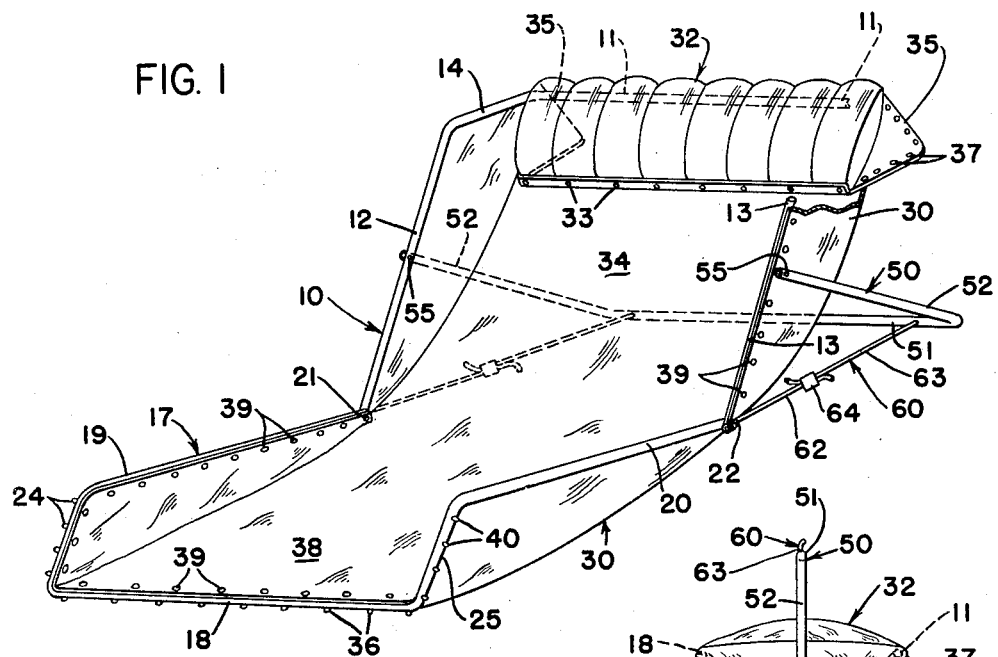
Figure 1 shows an isometric view of a preferred embodiment of the invention in the unfolded position to serve as a seat.

Referring now to the drawings as shown in Figure 1, the combination seat and bag device is comprised of a first rigid frame member 10 which is generally U-shaped and includes an upper edge or base 11 and a pair of spaced parallel side members each including base adjacent portions 14, 15 and base remote portions 12, 13 disposed at an angle relative to each other as is shown in Figure 1.

Figure 2:
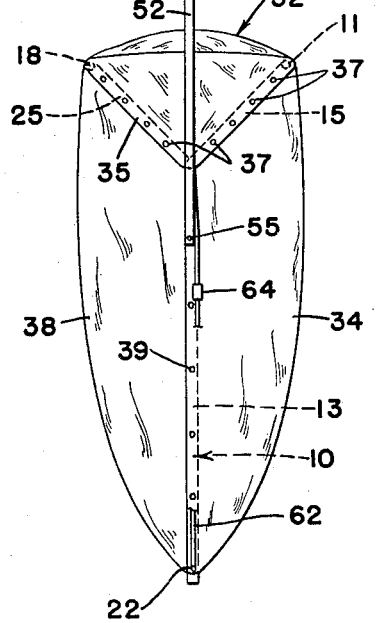
Figure 2 is a plan view of the embodiment of Figure 1 folded into a carrying bag.
Figure 3:
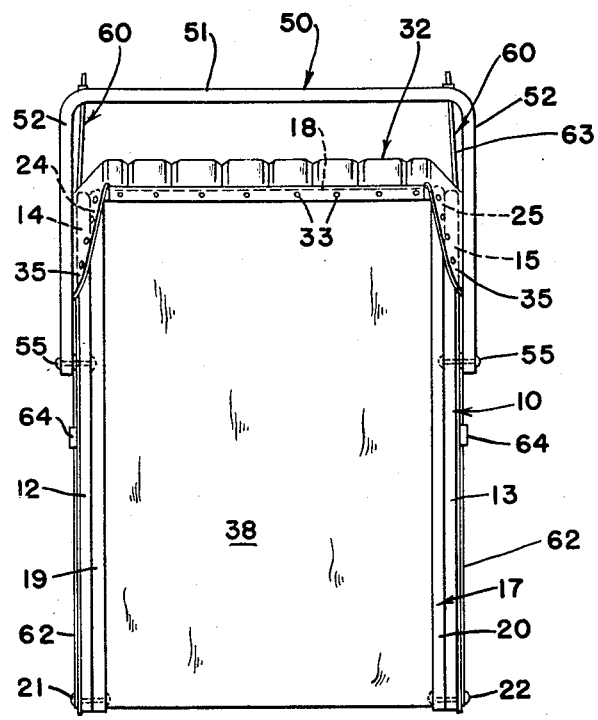
Figure 3 is a side view of the embodiment shown in Figure 2.

A second generally U-shaped rigid frame member 17 is substantially identical to the first frame member 10 and also includes an edge 18 and two spaced apart parallel side members each comprised of base adjacent portions 24, 25 and base remote portions 19, 20 respectively disposed at an angle relative to each other. It is to be noted that the base remote portions 12, 19 and 13, 20 are of substantially the same length and the ends remote from the bases 11, 18 overlap each other and are pivoted relative to each other by means of pivot pins 21, 22 respectively. It is to be noted that the legs 19, 20 overlap on the inside of the legs 12, 13 so that when the device is folded as is shown in Figures 2 and 3, the legs 19, 20 will be parallel to and on the inside of the legs 12, 13. Obviously the type of pivot may be otherwise so that the portions 12, 19 and the portions 13, 20 abut against each other in the line of movement as the portions are folded.

The portions 24, 25 and 14, 15 extend at an angle from the portions 12, 19 and 13, 20 respectively so that when the frames 10, 17 are folded as is shown in Figure 2, the portions 24, 25 and 14, 15 will diverge one from the other and the bases 11, 18 will be in substantial spaced relationship.

It will thus be seen that the frame members 10, 17 form a frame for a seat when in the opened out position and a frame for the carrying bag when in the folded position.

A relatively loose cover of flexible material such as canvas or the like, is secured to the frames 10, 17 in any desired manner. In the embodiment shown, this cover is comprised of a portion 34 within and fastened to the frame member 10 and an integral portion 38 within and fastened to the frame member 17. In the embodiment shown, the portion 38 overlaps on the inner surface of the frame member 17 and is fastened thereto in any desired means such as by means of screws 39 or rivets or the like.

The cover 34 however, is preferably fastened to the outer sides of the frame member 10 by means of screws 39 or the like.

In this way the portions 12 and 19 and the portions 13 and 20 may readily overlap with a metal to metal contact and without interference of the fabric of the cover 34, 38.

In the embodiment of the invention shown, means are provided for covering the opening formed by the diverging portions 24, 25 and 14, 15. Such means include a pillow-like member 32 extending across and generally fastened to the upper edge 11 and having a width slightly greater than the spacing between the bases 11, 18 when the device is in the folded position as shown in Figure 2. Any suitable means such as the snaps 33 may be provided along the free edge of the head portion 32 which may engage with corresponding coacting snap members 36 arranged along the outer edge of the base 18.

The head portion 32 may or may not enclose a roll of stuffing as is shown. In the embodiment shown, the head portion forms a convenient pillow when the device is used as a seat or chair and when used as a carrying bag, provides a rounded contour for the upper surface of the bag, giving a pleasing appearance.

A triangular portion 35 of cloth or the like, is fastened to the ends of the head portion 32, having a shape to cover over the end opening formed by the portions 24, 25 and 14, 15 where they diverge. This flap 35 may have snaps 37 arranged along its edge to coact with snaps 40 on the portions 24, 25 so that the bag may be completely enclosed when folded to the position shown in Figure 2.

When the device is used as a seat, the flaps 35 may be tucked under the head portion 32 as is shown in the left hand side of Figure 1. On the right hand side, portions of the frame member 10 are broken away for the purposes of clarity to show the flap 35 in greater detail.

A combination handle and support 50 is also provided comprised of a generally U-shaped member having a transverse bar portion 51 and a pair of parallel side legs 52, the ends of which side legs are pivoted to the base remote portions 12, 13 generally midway of their length by means of pivot pins 55. In this respect the legs 52 have a length such that when the device is being used as a carrying bag, the base or transverse bar portion 51 will be spaced a short distance above the upper surface of the head portion 32 which at this time is serving as a closure for the opening.

When the device is being used as a seat, the handle and support 50 is pivoted around so as to rest on the ground behind the frame member 10 and prop the frame member 10 at a desired angle.

It has been found that the handle and support 50 provides a steady support for the frame member 10 when the transverse bar portion 51 rests in sand or the like. However when the portion 51 rests on the grass or the like, it is generally desirable to prevent the handle and support from pivoting relative to the frame 10. For this purpose tension means are provided for fixing the angle between the handle and support 50 and the frame 10. Such means may take a number of different forms, but in the embodiment shown, an extensible cord arrangement 60 is provided including a cord 62 fastened to the pivot pin 22 and a cord 63 fastened to the base portion 51. These cords 62, 63 may be knotted together if desired, or a buckle arrangement 64 as shown may also be employed which enables the length of the arrangement to be adjusted.

Preferably the length of the two cords 62, 63 is such that when fully extended, the cords will have a length such as to just reach from the base portion 51 to the pivot pins 21, 22. Thus the cord 60 will be stretched taut when the device is being used as a carrying bag.

Thus when the device is being used as a carrying bag, the cord 60 will not hang or be apparent. When the device is being used as a seat, the cord 60 may be readily shortened to any desired length whereby the angle of the frame 10 relative to the ground may be readily pre-set to any desired value.

It will be noted that when the device is being used as a seat, the angle between the various portions of the side legs of each U frame in effect provides a side for the seat and for the back rest. In this case, it is to be noted that the fabric portion 38 generally rests on the ground when one is seated on the device so that the fabric is not generally under tension. The sides of the portion 38 fastened to the legs of the frame 17 also serve as a slight wind-break.

The portion 34 is also sufficiently loose so that the bent portions of the U-shaped frame 10 will provide sides for the seat, increasing the comfort of the user, and also serving as a partial wind-break. If desired, the head portion 32 may be propped up by any suitable means and/or extended to serve as a sun shade.

When the device is folded, as is shown in Figures 2 and 3, because of the shape of the frames 10 and 17, the device as a carrying bag will have a very substantial carrying capacity.

Also, the head portion 32 and the flaps 35 form a complete closure for the upper opening giving to the bag an over-all rounded and attractive appearance.

The invention has been described in detail by particular reference to a preferred embodiment which the invention may take. Obviously modifications and alterations will occur to others upon a reading and understanding of this specification, and it is my intention to include all such modifications and alterations insofar as they come within the scope of the appended claims.

Having thus described my invention, I claim:

1. A combination seat and carrying bag device comprising in combination first and second rigid U-shaped frames, each comprised of a base and a pair of parallel extending legs, means pivoting corresponding ends of said legs relative to each other at the end thereof, a third U-shaped frame comprised of a base and a pair of parallel extending legs each pivoted at its end to an intermediate point on the legs of said first frame, the length of the third frame legs being greater than the length from said intermediate point on said first frame to the base thereof, and a flexible cover connected to the base and legs of both said first and second frames and extending therebetween.

2. A combination seat and carrying bag device comprising in combination first and second rigid U-shaped frames each comprised of a base and a pair of parallel extending legs, means pivoting corresponding ends of said legs whereby said legs may be folded into juxtaposition, when said device is used as a carrying bag or opened out when said device is used as a seat, fabric means fastened to said bases and legs and extending therebetween, said legs when in juxtaposition having portions adjacent the base thereof which diverge whereby said bases are spaced from each other a predetermined distance when said legs are in juxtaposition, pillow means fastened at one edge to the base of said first frame and having a width greater than the width of the spacing of said bases when said legs are in juxtaposition, coacting fastening means on the second frame base and the corresponding edge of said pillow means, flap means on the ends of said pillow for covering the opening of said diverging portions of said legs, said diverging portions and said flaps having coacting fastening means, a third U-shaped frame forming a combined carrying handle and rest for said first frame member and comprised of a base and a pair of parallel extending legs pivoted at the ends to said first frame legs at a point spaced from the ends thereof and tension means extending from said pivot means, to said third frame at a point spaced from the ends of the legs thereof, the legs of said third frame having a length greater than the distance between the point of pivoting to said first frame legs and its base and said tension means having a maximum length equal to the maximum distance between its point of fastening to the first frame legs and the third frame whereby when said third frame is being used as a carrying handle, said tension means are under tension, said tension means being adjustable to a shorter length whereby said third frame may serve as a back rest for said first frame.

3. A combination seat and carrying bag device comprising first and second rigid U-shaped frames, each having a base and a pair of side members which extend transversely from opposite ends of the base at one side of the base, each side member having a base adjacent portion which is connected at one end to the base and extends transversely therefrom and a base remote portion which is connected at one end to the opposite end of the base adjacent portion and extends transversely therefrom, the opposite ends of the base remote portions at each end of the respective frames being hinged to each other whereby said frames may be folded into juxtaposition or extended apart from each other, said frames when in juxtaposition having their base remote portions at each end extending contiguous to each other and their base adjacent portions at each end extending away from each other and their bases spaced apart, a flexible cover connected to the base and side members of both frames and extending therebetween, and means for supporting said first frame in an upwardly extending position from the ground to provide a back rest when the frames are extended apart.

4. The device of claim 3 wherein there is provided a third U-shaped frame comprised of a base and a pair of parallel legs connected to opposite ends of the base, each of said legs being connected at one end to the base and extending transversely therefrom, the opposite ends of said legs being pivotally connected to intermediate points on the base remote portions of the side members of the first frame, the length of the third frame legs being greater than the length from said intermediate points on the first frame to the base thereof.

5. The device of claim 3 wherein there is provide pillow means fastened along the length of said first frame base, said pillow means having a dimension transverse to the length of said base sufficient to overlap the base of the second frame when the frames are in juxtaposition.

6. The device of claim 5 wherein flap portions are provided on the ends of said pillow means for closing the opening formed by the oppositely extending base adjacent portions at each end of the frames when the frames are in juxtaposition.

References Cited in the file of this patent

UNITED STATES PATENTS

| | | |
|---|---|---|
| 470,255 | Petrie | Mar. 8, 1892 |
| 1,140,997 | Minehart | May 25, 1915 |
| 1,219,437 | Butler | Mar. 20, 1917 |
| 1,561,241 | Karron | Nov. 10, 1925 |
| 1,647,297 | Johnson | Nov. 1, 1927 |
| 2,304,700 | Manville | Dec. 8, 1942 |

FOREIGN PATENTS

| | | |
|---|---|---|
| 556,719 | France | Apr. 19, 1923 |